Aug. 26, 1969     D. W. HUNT     3,463,157
ARTERY COMPRESSION CLAMP
Filed July 14, 1966
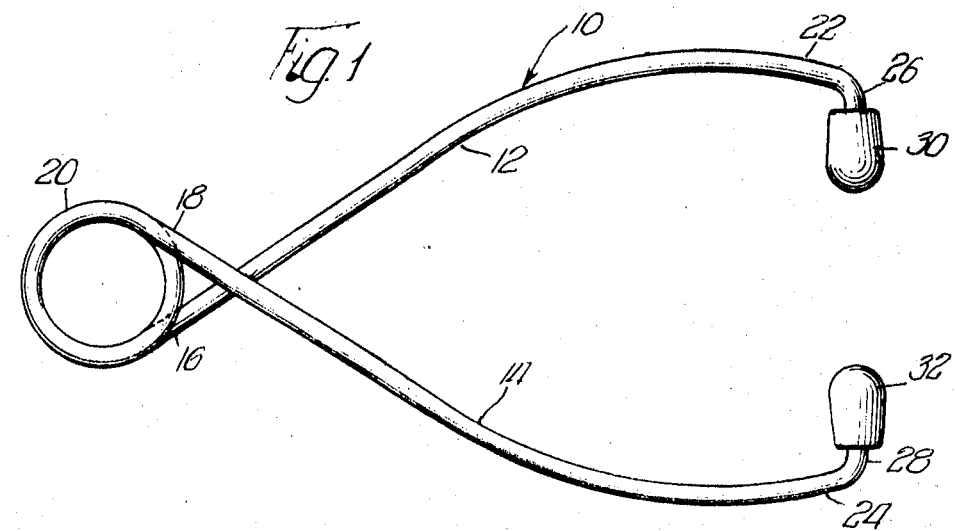
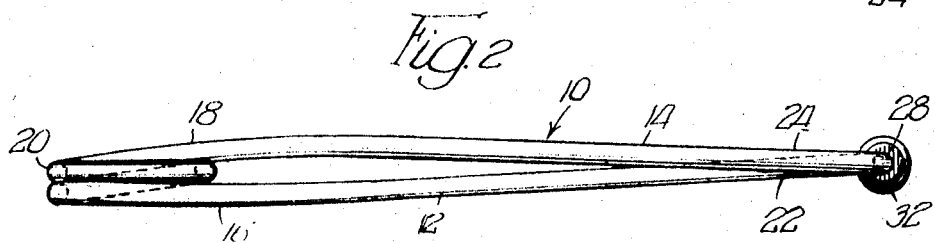
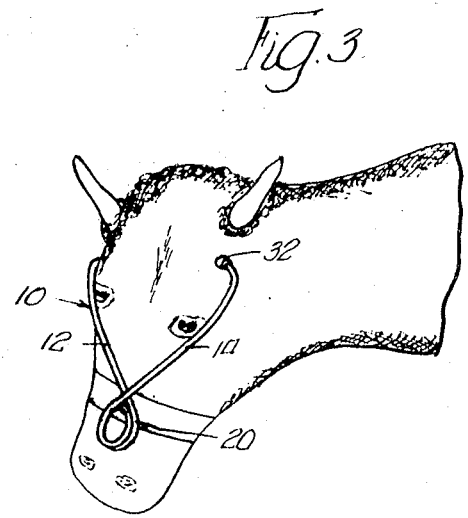
Inventor:
Donald W. Hunt
By Hume, Groen, Clement + Hume
Attys

United States Patent Office 3,463,157
Patented Aug. 26, 1969

3,463,157
ARTERY COMPRESSION CLAMP
Donald W. Hunt, Sunnyvale Farms, R.R. 2,
Arkansas City, Kans. 67005
Filed July 14, 1966, Ser. No. 565,270
Int. Cl. A61b 17/12
U.S. Cl. 128—325                                          1 Claim

ABSTRACT OF THE DISCLOSURE

An artery clamp for suppressing the flow of blood from the cornual arteries of a horned animal during dehorning. The clamp includes a pair of legs joined by a spring which compresses when the legs are urged apart. Attached to the free ends of the legs are bulbous pads shaped to conform to the animal's temporal fossae.

---

This invention relates to artery clamps and, in particular, to an artery clamp for suppressing the flow of blood from the cornual arteries of horned domestic animals (e.g. cattle) during and immediately after the dehorning process.

Except in the case of show animals, it is usually desirable to dehorn cattle and other domestic beasts, since animals with horns intact require more space and can cause damage to equipment, human operators and other animals. There are a number of well-known methods for dehorning, including chemical and circulatory techniques. However, in the case of older animals with well-developed horns, it is often necessary to effect mechanical removal, as by cutting or sawing.

In the mechanical removal of horns, special problems are encountered due to the fact that the horns are supplied with blood through the cornual arteries. During removal of the horns these arteries are of course severed, and it is therefore necessary to halt the flow of blood lest the animal bleed to death. This is usually accomplished by "pulling" the artery after each horns is removed. The operator is required to reach into the wound, usually with forceps, grasp the artery and pull gently until the artery breaks off several centimeters inside the animal's head. Once this is done, the pressure of the tissues surrounding the broken end of the artery prevents spurting of blood and permits ready clotting. The open wound is then treated with suitable blood coagulants and fly repellants.

It should be apparent, however, that the process of pulling the cornual arteries is rendered extremely difficult by the fact that the arteries are spurting blood. The blood completely fills the wound and obscures the arteries, and often drenches the operator's clothes and may even spurt into the operator's face and eyes. In addition, if the operator is forced to grope for the arteries, the resultant delay in pulling and eventual clotting may well cause a substantial weight loss in the animal due to excessive bleeding. It has therefore become highly desriable to provide some means for eliminating this blood flow from the cornual arteries during the dehorning and artery pulling operations.

Accordingly, the principal object of this invention is to provide an artery clamp for suppressing the flow of blood from the cornual arteries of cattle, goats, sheep, etc., during the dehorning and artery pulling operations.

It is a further object of this invention to provide an artery clamp which is automatically adapted to accommodate a wide range of sizes of animal heads and which, moreover, is automatically adapted to exert a proportionately greater compressive force on animal heads of a greater size.

Another object of this invention is to provide a cornual artery clamp characterized by simplicity of design and ease of operation and which, when properly positioned, readily remains in place throughout the dehorning and artery pulling operations.

In order to accomplish these and other objects, this invention has as a primary structural feature a pair of generally arcuate leg members each terminating in a compression pad at its free end. These pads are designed to contact the animal's head at the points where the cornual arteries emerge from the temporal fossa. The fixed ends of the leg members are attached to a resilient means which provides substantial resistance to moving apart of the free ends, thus causing the compression pads to exert sufficient force on the cornual arteries to impede the flow of blood therethrough.

A fuller understanding and appreciation of the foregoing objects and features will be derived from a consideration of the remainder of the specification and claim with particular reference to the drawing, in which:

FIGURE 1 is a plan view of a preferred construction embodying the invention;

FIGURE 2 is a side elevational view of the construction of FIGURE 1; and

FIGURE 3 is a pictorial representation showing the clamp in position on the head of an animal.

Referring particularly to FIGURES 1 and 2, there is illustrated an artery clamp 10 constructed in accordance with the claimed invention. The clamp 10 includes a pair of leg members 12 and 14 which are attached at their respective fixed ends 16 and 18 to a torsion spring 20. The respective free ends 22 and 24 of the leg members 12 and 14 terminate respectively in sharp relatively short opposed inward bends 26 and 28. Affixed to the free ends 22 and 24 of the leg members 12 and 14 are compression pads 30 and 32.

The operation of the clamp 10 may now be described. The operator spreads the leg members 12 and 14 and positions the clamp 10 on the animal's head, as shown in FIGURE 3. The compression pads 30 and 32 are seated in the hollows on either side of the head beneath the horns, the hollows being the points at which the cornual arteries pass through the temporal fossa. The force exerted by the compression pads 30 and 32, which is preferably in the range of 15 to 25 pounds when the pads are spread six inches apart, is sufficient to virtually eliminate any blood flow through the cornual arteries to the horns. With the clamp 10 remaining in place, the horns are removed with any conventional dehorning tool and the arteries are pulled. The clamp 10 is then removed and the necessary medications are applied to the wound.

It will be noted that the compression pads 30 and 32, which may be made of rubber or other suitable materials, are of such conformation that they will fit snugly into the hollows on the animal's head. The leg members 12 and 14 have a substantial outward curve near their free ends 22 and 24 so as to clear the eye bulges on the animal's head. Note also that, as shown in the drawing, spreading of the leg members 12 and 14 causes compression of the torsion spring 20 rather than extension, thus increasing the stability of the clamp. These features result in a clamp 10 which is easy to position on the animal's head and which will remain firmly in place without further attention from the operator during the dehorning and artery removal operations.

Moreover, the compressing force exerted on the arteries by the clamp 10 increases automatically in proportion to the size of the animal's head. Larger animals normally have a thicker covering of fat and hide on the surface of the head and, therefore, a greater pressure is required to insure adequate suppression of blood flow in the cornual arteries. However, because the reactive force exerted by the torsion spring 20 increases as the leg members 12 and 14 are spread, the larger the animal's head, the more pressure will be exerted by the compression pads 30 and 32.

The clamp 10 can be readily constructed from a single length of heavy wire, as shown in the drawing. A 9/32-inch diameter steel rod, tempered by oil quenching, has proved quite satisfactory in providing the required degree of strength and resiliency. Such material can be readily shaped and stress relieved to retain the desired conformation.

The compression pads 30 and 32 are preferably formed of rubber or similar tough but resilient material. Using rubber, the pads 30 and 32 may include an inner layer of hard rubber which is affixed to the inward bends 26 and 28 of the leg members 12 and 14 by any conventional means, such as force fit, adhesives, etc. This inner layer is in turn surrounded by an outer layer of softer, more pliable rubber which is generally shaped to conform to the hollow in the animal's skull through which the cornual artery passes. The outer layer of softer rubber may be roughened so as to resist movement and dislodging from the hollow.

Although the invention has been described with the requisite particularly, the disclosure is of course only exemplary. Consequently, numerous changes in the details of construction, size and materials will be apparent to those familiar with the art, and may be resorted to without departure from the scope of the invention as set forth in the following claim.

1. An artery clamp for suppressing the flow of blood through the cornual arteries of horned animals, comprising: a pair of leg members each having a free end and a fixed end; a torsion spring associated with said fixed ends and cooperatives therewith to resist movement of said free ends apart from one another, said torsion spring arranged so as to be subject to compression loading when said free ends of said leg members are forced apart and to extension loading when said free ends are forced together, said leg members and said torsion spring being integrally fabricated from a single piece of steel wire; and a pair of bulbous pads shaped for snug mating engagement with the temporal fossae of said animal, one of said pads being attached to each of said free ends, said pads and free ends being oriented such that said pads are aligned in substantially opposing co-axial relationship, said spring being of sufficient strength that said pads exert a force of from about 15 to about 25 pounds when said pads are separated from one another by about six inches.

References Cited

UNITED STATES PATENTS 1,389,436   8/1921   Cameron, W. J. _____ 128—17

FOREIGN PATENTS 16,123   7/1898   Great Britain.
227,507  10/1923   Great Britain.
681,541   9/1939   Germany.

RICHARD A. GAUDET, Primary Examiner
JOHN D. YASKO, Assistant Examiner

U.S. Cl. X.R.

128—76, 97